United States Patent [19]
Fischer et al.

[11] Patent Number: 5,938,000
[45] Date of Patent: Aug. 17, 1999

[54] CONVEYOR CHUTE FOR CHAIN SCRAPER CONVEYORS, IN PARTICULAR FOR USE IN MINING

[75] Inventors: Frank Fischer, Lünen; Siegfried Schmidt, Bottrop; Theo Wieger, Selm, all of Germany

[73] Assignee: DBT Deutsche Bergbau-Technik GmbH, Germany

[21] Appl. No.: 09/075,966

[22] Filed: May 11, 1998

[30] Foreign Application Priority Data

May 16, 1997 [DE] Germany .................... 197 20 536

[51] Int. Cl.⁶ .................................................. B65G 19/28
[52] U.S. Cl. ................................................. 198/735.4
[58] Field of Search .................... 198/735.1, 735.3, 198/734.4, 729, 860.3

[56] References Cited

U.S. PATENT DOCUMENTS 4,637,510  1/1987  Tomlinson ................... 198/735.4
4,705,160  11/1987  Grundken et al. ........... 198/860.3 X

FOREIGN PATENT DOCUMENTS 1 258 333  1/1968  Germany .
80 19 735  3/1981  Germany .
3302422    7/1984  Germany ..................... 198/735.4
34 05 986  8/1985  Germany .
40 06 183  9/1991  Germany .
36 28 179  7/1993  Germany .
2172564    9/1986  United Kingdom ........... 198/735.4

*Primary Examiner*—James R. Bidwell
*Attorney, Agent, or Firm*—Vickers, Daniels & Young

[57] ABSTRACT

A conveyor chute for chain scraper conveyors, in particular stope conveyors, having a bottom aperture provided in the conveyor bottom forming an inspection or repair aperture and closed by way of a closure panel during the conveying operation. The closure panel is guided in slot-shaped apertures of the two side profiles of the conveyor chute by way of their opposite panel edges and secured against displacement by a locking device. The two side profiles of the conveyor chute are each formed of two profile strips in superimposed array which are not interconnected to the conveyor bottom in the region of the bottom aperture. The two side profiles form the slot-shaped apertures in which the locking of the closure panel in the closed position takes place only on one of the two side profiles.

38 Claims, 3 Drawing Sheets

CONVEYOR CHUTE FOR CHAIN SCRAPER CONVEYORS, IN PARTICULAR FOR USE IN MINING

FIELD OF THE INVENTION

The invention relates to a conveyor chute for chain scraper conveyors, in particular for use in mining. The conveyor chute includes a bottom plate which forms the conveyor bottom and is weldedly connected between the side profiles. The side profiles are provided with guide passages for guiding the scraper flights and are provided with a bottom aperture which is closable by a removable closure panel, there is provided on both sides of the conveyor chute, in the region of the side profiles, slot-shaped apertures for engaging the closure panel in a transversally displaceable manner. The closure panel is releasably secured in the closure position against transverse displacement by a locking device.

BACKGROUND OF THE INVENTION

Chain scraper conveyors are preferably employed in mining and more particularly in underground mining operations. In this context it is known to provide individual conveyor chutes (gutter chutes) of the chain scraper conveyor with a closable bottom aperture which forms an inspection and repair aperture in order to permit repairs to possible damage to the scraper chain or chain ruptures in the lower length of the conveyor.

In a known conveyor chute for chain scraper conveyors the insert member insertable into a section of the chute to serve as a closure member takes the form of an approximately L-shaped component which in a single piece includes both the bottom panel closing the conveyor bottom aperture and connected thereto on one side the side profile member of the chute side profile. The closure panel engages by way of its free panel end into a slot-shaped rebate of the rigid side profile provided on the opposite side of the chute. Securing the insert member inserted into the chute takes place at the upper flanges of the side profile which accommodates the profile portion of the insert member. Spring shackles forced into pocket apertures of the profile flanges serve as locking elements (DE 36 28 179 C2, DE 34 05 986 A1). In another known conveyor chute for chain scraper conveyors the closure of the bottom aperture proceeds by means of a closure panel insertable into the former from above and which at its ends is releasably connected to the butt ends of the conveyor bottom (DE-AS 12 58 333). It has also been known for quite some time to provide slot shaped apertures in both side profiles of the conveyor chute through which the closure panel composed of an insertable plate is inserted from the outside of the conveyor chute laterally and transversely to the conveying direction (DE 80 19 735 U1). When installed the closure panel projects relatively far outside beyond both side profiles of the conveyor chute, it being secured by means of its projecting panel ends by means of wedges.

The side profiles of the conveyor chutes for chain scraper conveyors are known to have a variety of configurations. In this context it is also known to design the side profiles on both sides of the conveyor chute in a divided manner so that the two superimposed profile strips are connected by welding to the intermediate conveyor bottom (DE 40 06 183 A1).

SUMMARY OF THE INVENTION

It is an object of the invention to design a generic type conveyor chute with a bottom or inspection aperture at reduced production costs in such a manner that the cutting out of the slot apertures from the profile strips of the side profiles can be dispensed with, and providing easy and rapid insertion and removal of the closure panel at the operating site of the chain scraper conveyor. The closure panel in its closed position, is reliably lockable without the closure panel projecting in an undesirable manner on both sides beyond the outer limits of the side profiles, thereby interfering with the connection of built-on components of the conveyor chute.

This object is attained according to the invention in that the two side profiles of the conveyor chute are each composed of two profile strips in a superimposed array which by way of their profile webs directed towards the bottom plate, are affixed to the bottom plate by welding, and that the slot apertures are formed by the free web ends of the profile strips which in the region of the bottom aperture are spaced apart.

In this embodiment of the conveyor chute, the slot apertures of the side profiles, which serve to vertically secure and provide transverse slidability to the closure panel, result from the construction of the side profiles, each from two profile strips, preferably of equal configuration in conjunction with the configuration of the bottom aperture in the form of an aperture which extends over the entire width of the conveyor chute so that the slot apertures can be provided on the side profiles without a need for special finishing off. In the closed position, the closure panel is secured against being lifted in the slot apertures of the two side profiles. The closure panel is prevented from sliding in the lateral direction of the conveyor chute by one of the two sides of the chute, preferably by means of a simple locking element. Accordingly, the closure panel formed from a simple plate need not be made as wide as was previously done, where it projected in an interfering manner on both sides outwardly beyond the side profiles.

The securing of the inserted closure panel against transverse displacement on one side simplifies the fitting and removal of the closure panel. Handling is further simplified if, in accordance with a further advantageous embodiment of the invention, the arrangement is such that the closure panel, when the locking device is released, is drawn outwardly in the slot aperture provided on the side of the locking device in a transverse direction only so far as to be withdrawn inwardly from the slot aperture on the opposite side profile and can be swung upwardly with its free panel edge from the conveyor chute and out of the conveyor chute and out of the slot aperture provided on the side of the locking device. In this embodiment, after releasing the locking device here provided, the closure panel may thus be rapidly and easily removed at the operating site of the chain scraper conveyor in that its withdrawal takes place from the locking side which, in the case of a stope conveyor, represents the back-stowing side thereof, by only a short distance so far that it can be swung upward and out of the conveyor chute at its opposite panel end and be lifted out therefrom. It is therefore not necessary to provide major access on the locking or stowing side in order to be able to withdraw the closure panel over its full length laterally from the conveyor chute.

In a further advantageous embodiment of the invention, the bottom aperture is so provided that the butt surfaces of the bottom plate, welded to the profile strips of the side profile and which define that aperture in the transverse direction of the conveyor chute and, correspondingly, the side faces of the closure panel, extend approximately in the same direction at an acute angle to the transverse axis of the conveyor chute. Preferably, the butt surfaces are mounted to the profile strips such that the slot aperture on the locking side (stowing side) lies beyond the centre of the conveyor chute, where in general the self-advance mechanism connecting means for advancing the chain scraper conveyor is fitted. Furthermore, it is recommended to so design the bottom aperture that it expands slightly conically towards the locking side resulting likewise in facilitation of handling during assembly and dismantling of the closure panel. For that purpose the inclination of the one butt area of the fixed bottom plate and the associated side area of the closure panel is preferably set approximately one to two angle degrees larger than that of the other butt area and associated side area of the closure panel. The butt areas defining the bottom aperture of the fixed bottom plate of the conveyor chute are preferably formed by chamfered edges inclined to the vertical, forming abutment surfaces for the correspondingly inclined chamfered edges of the bottom plate, a reliable closure of the gap along the bottom aperture being thereby attained after the closure panel has been fitted. As for the remainder, the width of the closure panel and the corresponding dimension of the bottom aperture, viewed in the conveyance direction, may be considerably smaller than its longitudinal dimension transversely to the conveyance direction.

The profile strips, which in pairs on both sides of the conveyor chute, form the side profiles, preferably, in a manner known per se are provided with moulded-on flange strips which cause the profile flanges to flare outwardly. These flange strips may be used for connecting on the inside by welding fittings which on the locking side comprise the locking device serving for securing the closure panel. A simple bolt bar or pivoting latch or the like may be used as the locking device.

On the outside of the side profile provided on the locking side (stowing side), at least one rigid fitting may be provided which, by serving as an abutment, limits the degree of transverse displacement of the closure panel during its being fitted or removed and which may e.g. be of fork-shaped design and form the connection for the self-advancing mechanism. It may further be advisable to fit the closure panel with a handle member on the end projecting from the slot aperture provided on the locking side.

In what follows the invention will be further elucidated by way of preferred working examples illustrated in the drawings.

DETAILED DESCRIPTION OF THE DRAWINGS

Figure 1:
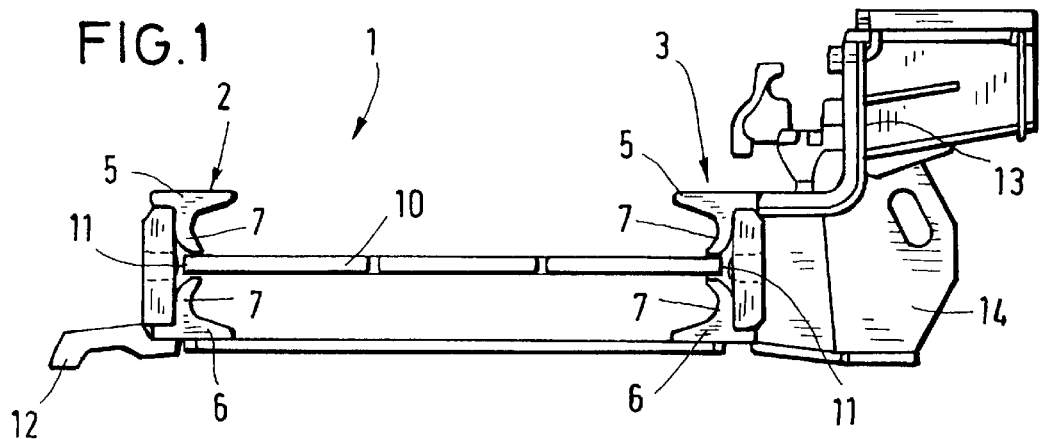
FIG. 1 shows a conveyor chute of a chain scraper conveyor according to the invention in cross-section.
Figure 2:
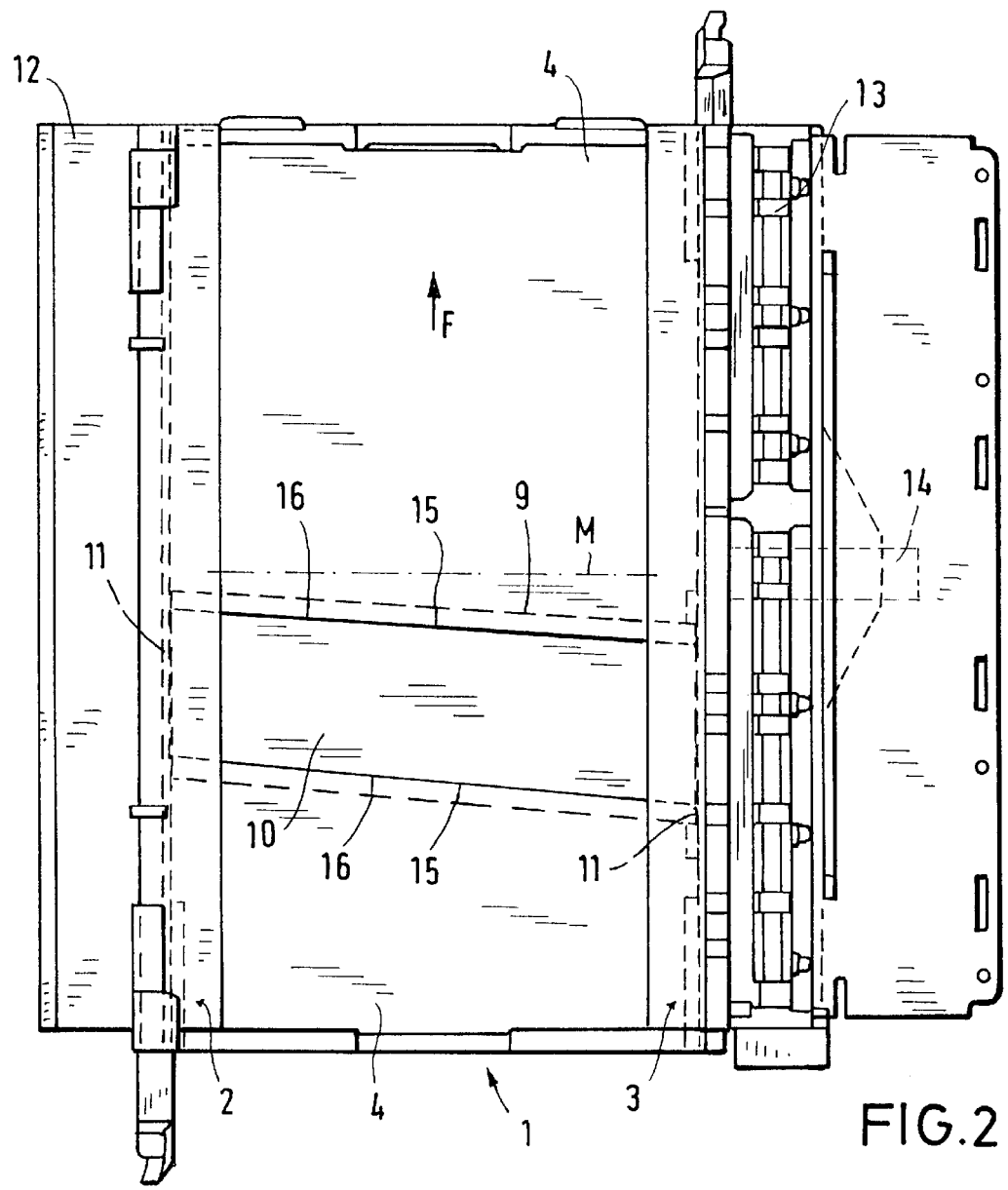
FIG. 2 shows the conveyor chute according to FIG. 1 in a plan view.

The conveyor chute 1 (gutter chute) of a chain scraper conveyor, shown in FIGS. 1 and 2, consists in a manner known per se of the two side profiles 2 and 3 fixed by welding to the bottom plate 4 forming the conveyor bottom. Each of the two side profiles 2 and 3 of the conveyor chute is formed by two profile strips 5 and 6 of equal configuration which are welded to the bottom plate 4 by way of their slightly arcuate profile webs 7 directed towards the bottom plate 4 which thus is fixed to each of the two side profiles 2 and 3 between the profile webs of the two profile strips 5 and 6. The profile strips 5 and 6 are composed of rolled or cast profiles provided with profile flanges 8 and at the same time constitute the guide passages for the scraper flights running in the conveyor chute of the driven scraper chain belt. Conveyor chutes of this construction are known from DE 40 06 183 A1 the disclosure of which may be referred to.

As shown in FIG. 2, conveyor chute 1, at its bottom plate 4 welded to profile strips 5 and 6 of the two side profiles 2 and 3, comprises a bottom aperture 9 extending over the entire width of the conveyor chute. Bottom aperture 9 is in bottom plate 4 between parallel side profiles 2 and 3, and which forms an inspection or repair aperture which during the conveying operation, is closed by a closure panel 10. Closure panel 10 is composed of a shaped plate and which, for carrying out inspection or repair operations to the lower length of the chain scraper conveyor, can be removed from the conveyor chute 1. Having regard to the arrangement of bottom aperture 9, profile strips 5 and 6 with their profile webs 7, over a distance corresponding to the width of the bottom aperture, are not welded to the bottom plate but are so provided that a gap is formed between the ends of their profile webs 7, approximately corresponding to the thickness of bottom plate 4 or closure panel 10. Accordingly, along the two side profiles 2 and 3 between the free ends of profile webs 7 of profile strips 5 and 6, slot-shaped apertures 11 are formed into which the closure panel fits with its two opposing ends, whereby the latter are secured in their closed position against being lifted.

In the illustrated embodiment, the connecting members for a drum rock cutter machine, running above the chain scraper conveyor, are fitted to the conveyor chute 1, preferably a guide rail 12 on the mining face side at the base of the side profile 2 and, on side profile 3 on the back-stowing side, a bracket-like fitting 13 which forms a guide profile including a chain passage for a pin wheel drive chain as well as a connecting fitting 14 for connecting a self-advance mechanism are secured to conveyor chute 1 as known to those skilled in the art. Alternatively, it is also possible for the connecting fittings for a rock plough guide means of known type to be fitted to the conveyor chute.

As shown in FIG. 2, bottom aperture 9 is off-set in relation to the conveyor chute centre indicated by the transverse central axis M in the direction towards one end of the chute, i.e. arranged off centre in relation to the conveyor chute. The width of bottom aperture 9 and of the closure panel 10 in the direction of conveyance F is considerably smaller than its longitudinal dimension transversely to the conveying direction F between two side profiles 2 and 3. In view of the oblique arrangement of bottom aperture 9, the slot aperture on the back-stowing side of the conveyor chute on which the installed closure panel 10 is locked, is outside of the centre of the conveyor chute spaced sideways in relation to connection fitting 14 for connecting the self-advance mechanism, so that for dismantling closure panel 10 can be shifted to that side, in the direction of arrow S, over its entire length or optionally only part of its length guided in the slot aperture of the side profile 3 without interference by the self-advance mechanism connection.

Figure 6:
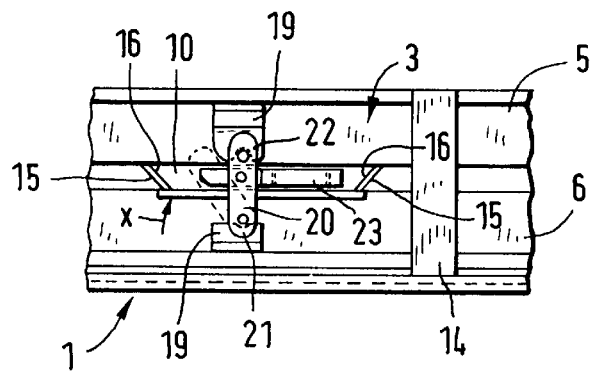
FIG. 6 shows the conveyor chute according to FIGS. 3A and 3B in a side elevation in the direction of the arrow VI in FIG. 3A.
Figure 5:
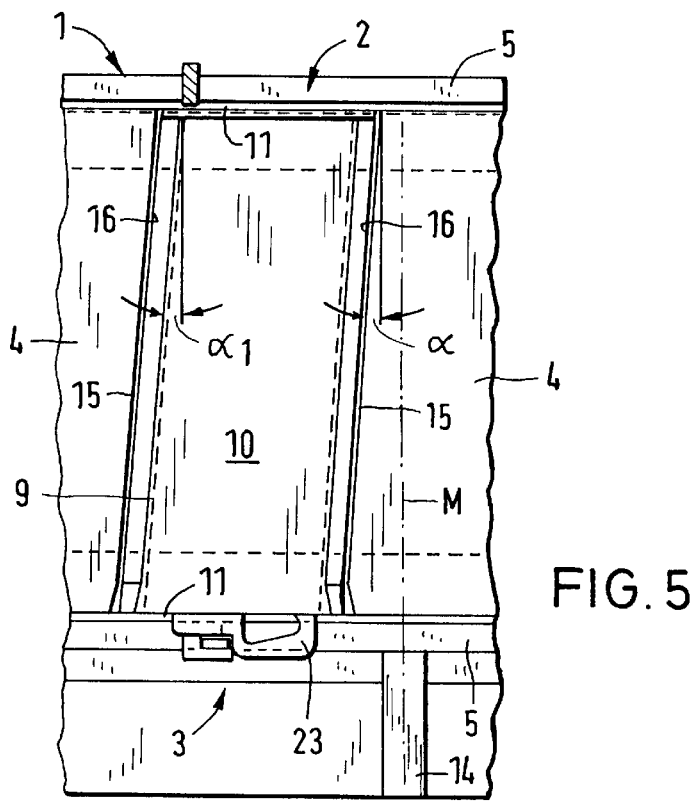
FIG. 5 shows a partial plan view of the conveyor chute according to FIGS. 3A and 3B with installed and secured closure panel.

As shown more clearly in the partial plan view according to FIG. 5, the butt areas 15 of rigid bottom plate 4, outlining bottom aperture 9 in the transverse direction of the conveyor chute and correspondingly the side areas 16 of closure panel 10 are shaped at an acute angle to the transverse axis of conveyor chute 1, each obliquely approximately in the same direction. Preferably, the bottom aperture 9 and closure panel 10 of matching dimensions are so designed that they flare slightly conically with regard to width towards the locking side (back-stowing side) of the conveyor chute. For this purpose the inclination denoted in FIG. 5 by the angle α of butt area 15 here provided of bottom plate 4 and of associated side area 16 of the closure panel may be larger by about one to two angular degrees than the inclination of the other butt area 15 and side area 16 denoted by the angle α1. In view of the resulting slight conical expansion of bottom aperture towards side profile 3, the assembly and dismounting of the closure panel 10 is facilitated. In this regard it is also advantageous if end faces 15 of rigid bottom plate 4, as shown in FIG. 6, on both sides defining the bottom aperture 9, are formed by chamfered edges inclined to the vertical which form support areas for the correspondingly chamfered side areas 16 of closure panel 10. This edge chamfering results in a tight enclosure of the conveyor chain length of the conveyor chute during the conveying operation.

Figure 3A:
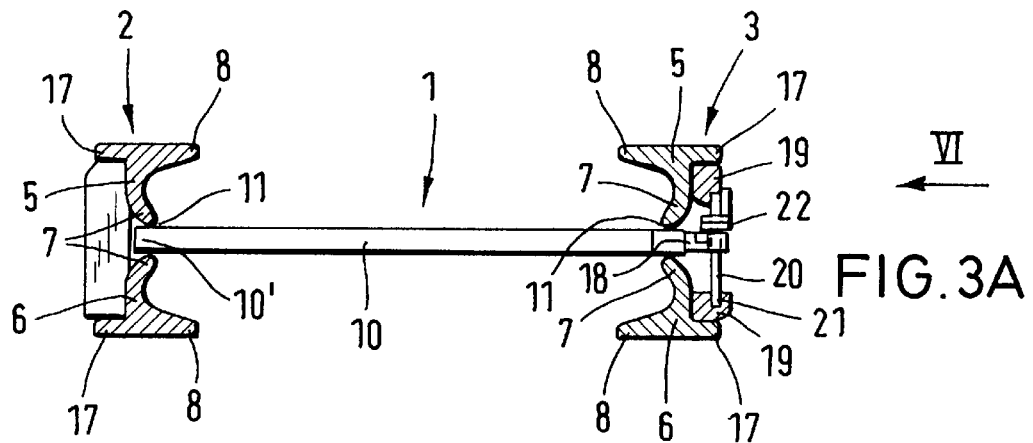
FIG. 3A shows a conveyor chute according to the invention in cross-section including a fitted and secured closure panel.

FIG. 3A represents the conveyor chute according to the invention in cross-section with closure panel 10 installed, which closes bottom aperture 9. It may be seen that closure panel 10, when fitted, is embraced at its two mutually parallel panel edges 10' in slot apertures 11 which outline bottom aperture 9 at the two conveyor chute sides, without projecting beyond the outer limits of side profiles 2 and 3. By being embraced in slot apertures 11, formed by the free ends of web members 7 of superimposed profile strips 5 and 6 over the extent of the width of bottom aperture 9, closure panel 10 is reliably secured against being lifted. Securing inserted closure panel 10 against displacement in the horizontal direction, takes place along only one of the two side profiles of the conveyor chute, more particularly, in the case of a stope conveyor, on side profile 3 provided on the back-stowing side. It will be seen that four profile strips 5 and 6 each are provided with a moulded-on outwardly directed flange ledge 17 which broadens respective profile flange 8. The locking device serving for securing closure panel 10 against shifting is provided, in the case of a stope conveyor, on the back-stowing side on which inserted closure panel 10, by means of its panel end 10' here provided, projects outwardly from the slot-shaped guide 11'. Panel end 10' is provided with a panel projection 18. Fittings 19, on which the locking mechanisms of closure panel 10 are provided, are fitted to the outside of profile strips 5 and 6 of side profile 3 at an angle between flange projections 17 and profile webs 7. The locking mechanism may take different forms and may comprise as a latch element a strip shaped latch, a latch pin, a barrel bolt, locking pin or the like. In the working example illustrated, the latch mechanism takes the form of a small narrow latch strip in the form of a pivoting latch 20 which by means of its downward convex semi-circularly shaped end, is insertable into a matchingly shaped counterbearing-like upwardly open pivot pocket 21 of the fitting 9 provided on the lower profile strip. As illustrated in FIG. 6, the pivoting latch 20 can be swung up in the direction of arrow X into the vertical locking position in which it engages into a matching downwardly open pocket of the upper fitting 19, in which locking position it is fixed e.g. by means of a bolt, a clamping sleeve or the like. In this latch position, closure panel 10 is secured at its outermost panel projection 18 against horizontal displacement. This may be brought about, for example, in that a laterally open slot is provided on panel projection 18 into which pivoting latch 20, when swung upwardly, swings into the illustrated locking position against upper fitting 19'.

In order to dismount closure panel 10 from the closed position shown in FIG. 3A, the latching against side profile 3 is released, which may take place by pivoting pivoting latch 20 against the direction of arrow X of FIG. 6 after releasing safety bolt 22 of the pivoting latch. Thereafter, the unlatched closure panel 10 may be withdrawn in the horizontal direction, according to arrow S, towards that side for some distance from the slot aperture 11 of the side profile 3. Preferably, closure panel 10 is withdrawn a sufficient distance such that its panel end 10' emerges from the slot aperture 11 of the side profile 2 inwardly, thereby allowing closure panel 10 with its panel end 10' to be swung upwardly from the conveyor chute into the position indicated in dash-dotted lines in which it may then be withdrawn in the direction of arrow S1 from slot aperture 11 of side profile 3 and may thus be removed from the conveyor chute. The procedure, when assembling closure panel 10, proceeds analogously in the reversed operating direction.

Figure 7:
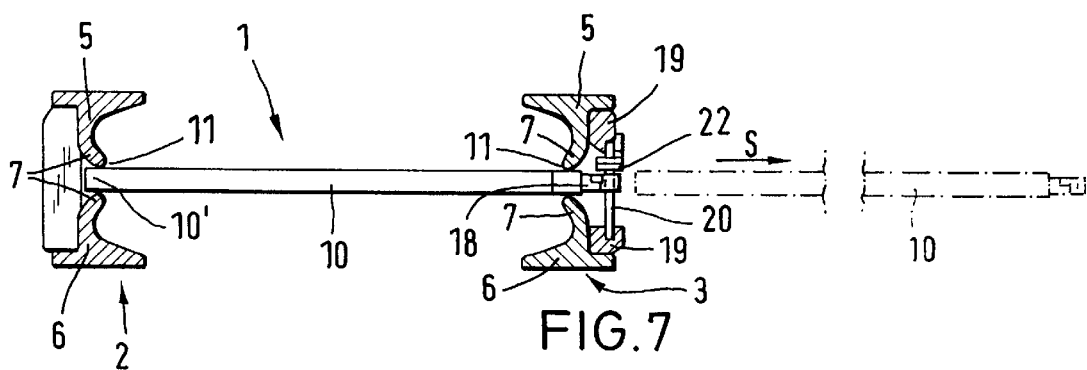
FIG. 7 shows the conveyor chute according to FIGS. 3A and 3B showing a modification of the facilities for fitting and dismantling the closure panel.

Instead it is, however, also possible according to FIG. 7 to withdraw closure panel 10 inserted into conveyor chute 1 after releasing its latching over its full length laterally in the direction of arrow S from the conveyor chute. However, this manner of dismantling requires a relatively large access space next to the chain scraper conveyor and is in general less favourable than the manner of dismantling shown in conjunction with FIG. 3B.

FIG. 5 in addition shows that at the panel end, provided on the side of the locking mechanism, a handle member 23 may be fitted to the outside of the closure panel 10 by means of which, after the release of the latching, closure panel 10 can be withdrawn in the direction of arrow S from the side profile 3. The handle member also can be utilisable when installing closure panel 10.

Figure 3B:
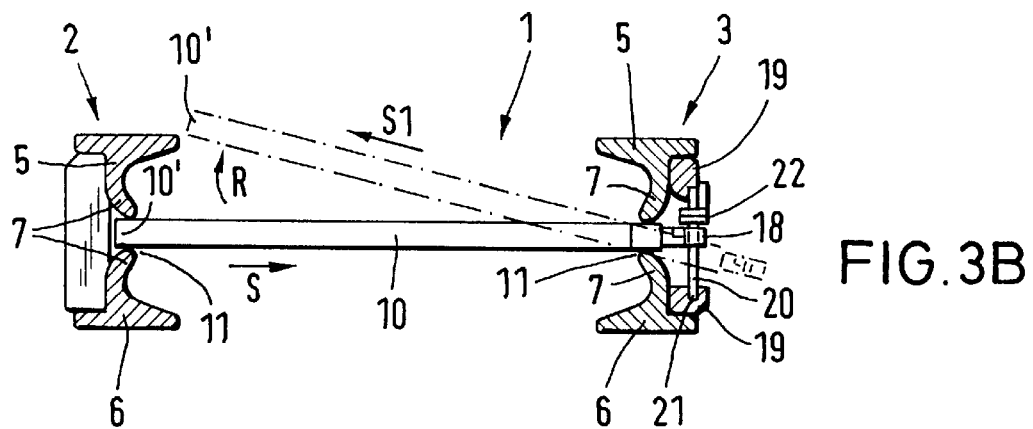
FIG. 3B shows in the same view as in FIG. 3A the operation of dismantling the closure panel.
Figure 4:
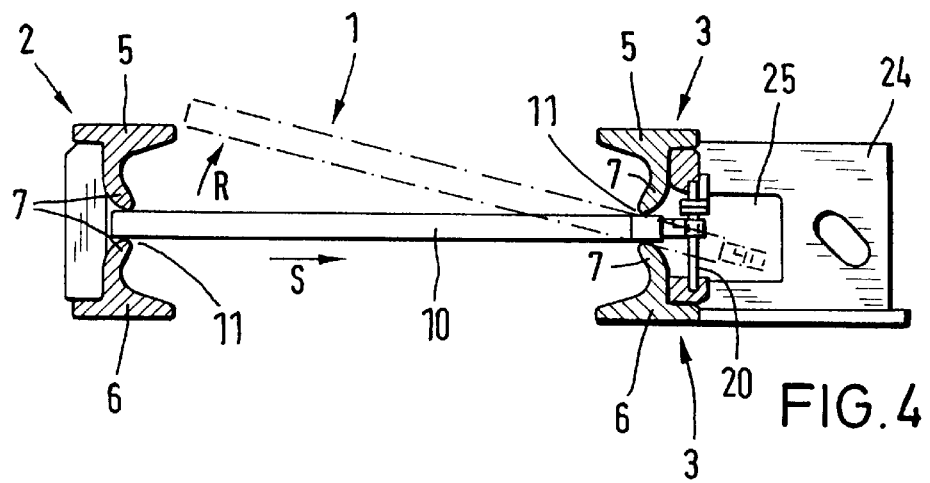
FIG. 4 shows in a cross-sectional view as in FIGS. 3A and 3B the provision of an external fitting on the side profile of the conveyor chute where the locking mechanism is provided.

The embodiment according to FIG. 4 differs from that according to FIGS. 3A and 3B essentially in that a fitting 24, which serves for the articulated linkage thereto of the moving mechanism used for advancing the chain scraper conveyor or the self-advancing apparatus serving as such moving means, is fitted, e.g. by welding to the outside of the side profile 3 or its two symmetrically superimposed profile strips 5 and 6. Fittings 24 simultaneously acts as a stop member which limits the displacement movement of closure panel 10 in the direction of arrow S. For that purpose, in the embodiment illustrated, fitting 24 comprises a rebate 25 ahead of the slot-shaped aperture 11 of the side profile 3 and open in the direction thereto, into which during dismantling closure panel 10, as indicated in dash dotted lines, may be withdrawn so far in the direction of arrow S that it may subsequently on one side be lifted in the direction of arrow R and then, as described in conjunction with FIG. 3B, be lifted out of the conveyor chute in the direction of arrow S1. Thus, fitting 24 determines the degree of transverse shifting of the closure panel 10 in the direction of arrow S during its disconnection.

It stands to reason that the invention is not limited to the embodiments described in the aforegoing but may be subjected to a variety of modifications without departing from the scope of the invention. This applies also to the closure panel inserted into the conveyor chute being secured against displacement by means of latch mechanisms for which a variety of latch elements can be used. The described embodiment of slotted apertures 11 for accommodating the closure panel in its installed condition is of particular importance for the conveyor chute according to the invention, being formed as described above in that in the case of each of two side profiles 2 and 3 profile strips 5 and 6 are arranged a in superimposed manner are not interconnected in the region of bottom aperture 9 at their profile webs 7, so that between the mutually facing free ends of the profile webs a slot-shaped aperture is formed which corresponds approximately to the thickness of the closure panel.

We claim:

1. A conveyor chute for chain scraper conveyors, in particular for use in mining, comprising side profiles provided with guide passages to guide scraper flights of a scraper chain, a bottom plate forming a conveyor bottom that is connected between said side profiles, said bottom plate provided with a bottom aperture which is closably by a removable closure panel, and slot-shaped apertures on both sides of the conveyor chute for engaging said closure panel in a transversely displaceable manner; said closure panel being releasably secured in its closed position against transverse displacement by a locking device; said side profiles each composed of two profile strips in a superimposed array and are affixed to said bottom plate; said slot-shaped apertures formed by ends of said profile strips which are spaced apart; two of said profile strips form said side profiles and are provided with molded flange strips that increase the width of profile flanges to which flange strip fittings are affixed and wherein said locking device is fitted to said fittings.

2. A conveyor chute as defined in claim 1, wherein said locking device comprises a latch element selected from the group consisting of a clamping sleeve, a bolt bar, a pivoting latch, a strip-shaped latch, a latch pin or a locking pin.

3. A conveyor as defined in claim 1, wherein said locking device for said closure panel in said closed position is attached only on one of said two side profiles of said conveyor chute.

4. A conveyor chute as defined in claim 1, wherein said locking device includes at least one fitting positioned on the outside of said one of said side profiles, said fitting acting as a stop to limit the degree of transverse displacement of said closure panel.

5. A conveyor chute as defined in claim 4, wherein said fitting is designed as a connecting member to be connected to a self-advancing mechanism for the conveyor.

6. A conveyor chute as defined in claim 4, wherein said fitting having a fork-shaped design.

7. A conveyor chute as defined in claim 1, wherein said flange strips are affixed in a nonparallel relationship to the longitudinal axis of said side profiles.

8. A conveyor chute as defined in claim 2, wherein at least one flange strip includes a slot to receive at least a portion of said latch element.

9. A conveyor chute for chain scraper conveyors, in particular for use in mining, comprising side profiles provided with guide passages to guide scraper flights of a scraper chain; a bottom plate forming a conveyor bottom connected between said side profiles; said bottom plate being provided with a bottom aperture which is closably by a removable closure panel; said conveyor chute being provided on both sides with slot shaped apertures for engaging said closure panel in a transversely displaceable manner; said closure panel being releasably secured in its closure position against transverse displacement by a locking device; said side profiles each composed of two profile strips in a superimposed array and are affixed to said bottom late; said slot-shaped apertures being formed by ends of said profile strips which are spaced apart; and said closure panel includes a handle member on the side where said locking device is provided, said handle member having an end projecting from said slot-shaped aperture.

10. A conveyor chute for chain scraper conveyors comprising side profiles to guide scraper flights of a scraper chain, and a bottom plate forming a conveyor bottom that is connected between said side profiles; said bottom plate having a bottom aperture which is closable by a removable closure panel; said side profiles each including two profile strips forming slot-shaped apertures at each end of said bottom aperture, said slot-shaped apertures engaging said closure panel in a transversely displaceable manner, said closure panel having two side walls, said side walls substantially parallel to one another over a majority of the length of said side walls and extending obliquely to the longtitudinal axis of said side profiles when said closure panel is secured in said bottom aperture.

11. A conveyor chute as defined in claim 10, wherein said side walls of said closure panel are substantially parallel throughout the length of said side walls.

12. A conveyor chute as defined in claim 10, wherein said ends of said closure panel are substantially parallel to one another and substantially parallel to said side profiles when said closure panel is secured in said bottom aperture.

13. A conveyor chute as defined in claim 11, wherein said ends of said closure panel are substantially parallel to one another and substantially parallel to said side profiles when said closure panel is secured in said bottom aperture.

14. A conveyor chute as defined in claim 10, wherein one of said closure panel ends is longer than the other of said closure panel ends.

15. A conveyor chute as defined in claim 12, wherein one of said closure panel ends is longer than the other of said closure panel ends.

16. A conveyor chute as defined in claim 13, wherein one of said closure panel ends is longer than the other of said closure panel ends.

17. A conveyor chute as defined in claim 12, wherein said side walls of said closure panel are longer than said end walls.

18. A conveyor chute as defined in claim 15, wherein said side walls of said closure panel are longer than said end walls.

19. A conveyor chute as defined in claim 10, wherein said bottom aperture of said bottom plate includes butt areas and said side walls of said closure panel having side areas, said butt areas having chamfered edges inclined to the vertical, said side areas having chamfered edges corresponding to said chamfered edges of said butt area, said chamfered edges of said butt areas forming support areas for said side areas of said closure panel.

20. A conveyor chute as defined in claim 16, wherein said bottom aperture of said bottom plate includes butt areas and said side walls of said closure panel having side areas, said butt areas having chamfered edges inclined to the vertical, said side areas having chamfered edges corresponding to said chamfered edges of said butt area, said chamfered edges of said butt areas forming support areas for said side areas of said closure panel.

21. A conveyor chute as defined in claim 18, wherein said bottom aperture of said bottom plate includes butt areas and said side walls of said closure panel having side areas, said butt areas having chamfered edges inclined to the vertical, said side areas having chamfered edges corresponding to said chamfered edges of said butt area, said chamfered edges of said butt areas forming support areas for said side areas of said closure panel.

22. A conveyor chute as defined in claim 10, including a fitting positioned on the outside of at least one of said side profiles, said fitting acting as a stop to limit the degree of transverse displacement of said closure panel.

23. A conveyor chute as defined in claim 20, including a fitting positioned on the outside of at least one of said side profiles, said fitting acting as a stop to limit the degree of transverse displacement of said closure panel.

24. A conveyor chute as defined in claim 21, including a fitting positioned on the outside of at lest one of said side profiles, said fitting acting as a stop to limit the degree of transverse displacement of said closure panel.

25. A conveyor chute as defined in claim 10, including a lock to releasably secure said closure panel in said bottom aperture.

26. A conveyor chute as defined in claim 23, including a lock to releasably secure said closure panel in said bottom aperture.

27. A conveyor chute as defined in claim 24, including a lock to releasably secure said closure panel in said bottom aperture.

28. A conveyor chute as defined in claim 10, wherein said bottom plate is welded to said profile strips.

29. A conveyor chute as defined in claim 18, wherein said lock is positioned on one of said side profiles.

30. A conveyor chute as defined in claim 10, wherein said closure panel is transversely slidable in an outward direction so that an end of said closure panel is withdrawn from one of said slot-shaped apertures so that said closure panel can be swung upwardly and be removed in an upward direction from said conveyor chute.

31. A conveyor chute as defined in claim 26, wherein said closure panel is transversely slidable in an outward direction so that an end of said closure panel is withdrawn from one of said slot-shaped apertures so that said closure panel can be swung upwardly and be removed in an upward direction from said conveyor chute.

32. A conveyor chute as defined in claim 27, wherein said closure panel is transversely slidable in an outward direction so that an end of said closure panel is withdrawn from one of said slot-shaped apertures so that said closure panel can be swung upwardly and be removed in an upward direction from said conveyor chute.

33. A conveyor chute as defined in claim 12, including flange strips attached to said profile strips, said flange strips increasing the width of said profile strips to which flange fittings are affixed and wherein said lock is attached to said flange fittings.

34. A conveyor chute as defined in claim 31, including flange strips attached to said profile strips, said flange strips increasing the width of said profile strips to which flange fittings are affixed and wherein said lock is attached to said flange fittings.

35. A conveyor chute as defined in claim 32, including flange strips attached to said profile strips, said flange strips increasing the width of said profile strips to which flange fittings are affixed and wherein said lock is attached to said flange fittings.

36. A conveyor chute as defined in claim 26, wherein said locking device comprises a latch element selected from the group consisting of a clamping sleeve, a bolt bar, a pivoting latch, a strip-shaped latch, a latch pin or a locking pin.

37. A conveyor chute as defined in claim 22, wherein said fitting is designed as a connecting member to connect to a self-advancing mechanism for the conveyor.

38. A conveyor chute as defined in claim 10, wherein said closure panel includes a handle member on one end of said closure panel.

* * * * *